(12) United States Patent
Ramaswamy et al.

(10) Patent No.: US 12,431,814 B2
(45) Date of Patent: Sep. 30, 2025

(54) CAPACITOR VOLTAGE BALANCING TECHNIQUES FOR MULTI-LEVEL DUAL ACTIVE BRIDGE CONVERTER

(71) Applicant: Caterpillar Inc., Peoria, IL (US)

(72) Inventors: Jyothiraditya Ramaswamy, Anupuram (IN); Karthik Desingu, Puducherry (IN); Jackson Wai, Dunlap, IL (US); Ahmed Khalil, Dunlap, IL (US); Jean Marcos Lobo da Fonseca, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 208 days.

(21) Appl. No.: 18/368,738

(22) Filed: Sep. 15, 2023

(65) Prior Publication Data
US 2025/0096692 A1 Mar. 20, 2025

(51) Int. Cl.
| | |
|---|---|
| *H02M 3/335* | (2006.01) |
| *H02M 1/088* | (2006.01) |
| *H02M 7/483* | (2007.01) |
| *H02M 7/487* | (2007.01) |

(52) U.S. Cl.
CPC ....... *H02M 3/33573* (2021.05); *H02M 1/088* (2013.01); *H02M 3/33584* (2013.01); *H02M 7/4833* (2021.05); *H02M 7/487* (2013.01)

(58) Field of Classification Search
CPC ............ H02M 3/33573; H02M 1/088; H02M 3/33584; H02M 7/4833; H02M 7/487; H02M 7/537
See application file for complete search history.

(56) References Cited

U.S. PATENT DOCUMENTS

| | | | |
|---|---|---|---|
| 6,072,707 A * | 6/2000 | Hochgraf | H02M 7/5387 363/136 |
| 9,571,006 B2 * | 2/2017 | Stahl | H02M 7/53871 |
| 10,554,144 B2 | 2/2020 | Cao et al. | |
| 10,608,522 B2 | 3/2020 | De Doncker et al. | |
| 10,749,441 B1 * | 8/2020 | Singh | H02M 3/33584 |
| 10,873,254 B2 | 12/2020 | De Doncker | |
| 11,522,437 B1 * | 12/2022 | Sangsefidi | H02M 1/007 |
| 2004/0239401 A1 * | 12/2004 | Liao | H02M 7/53871 327/423 |
| 2015/0049518 A1 * | 2/2015 | Harrison | H02M 7/4807 363/17 |
| 2015/0146455 A1 * | 5/2015 | Engel | H02M 3/33507 363/17 |
| 2019/0173387 A1 * | 6/2019 | Tanaka | H02M 1/08 |
| 2019/0312521 A1 * | 10/2019 | Cao | H02M 5/4585 |
| 2019/0386572 A1 * | 12/2019 | Itoh | H02M 1/40 |
| 2020/0007022 A1 * | 1/2020 | De Doncker | H02M 1/088 |

(Continued)

*Primary Examiner* — Yusef A Ahmed (57) ABSTRACT

Capacitor voltage balancing techniques are described for a 3-level 3-level dual-active-bridge converter that controls the duration of a zero voltage state of the low voltage (LV) and medium (MV) side transformer voltages based on a voltage difference between the upper and lower capacitors of both the LV and MV sides independently, the power delivered (P), and the LV and MV DC voltages. This control varies the angle to maintain the power requirement, which induces the additional voltage drop across the transformer inductance to produce the required current to flow through the capacitors and balance the capacitor voltages.

18 Claims, 9 Drawing Sheets

(56) References Cited

U.S. PATENT DOCUMENTS

| | | | |
|---|---|---|---|
| 2021/0408927 A1* | 12/2021 | Zhang | H02M 3/01 |
| 2022/0140738 A1* | 5/2022 | Lin | H02M 3/33584 363/17 |
| 2024/0039415 A1* | 2/2024 | Ramaswamy | H02M 3/33515 |
| 2025/0055378 A1* | 2/2025 | Elezab | H02M 3/33573 |
| 2025/0080002 A1* | 3/2025 | Desingu | H02M 1/0043 |
| 2025/0156593 A1* | 5/2025 | Kim | G06F 30/13 |

* cited by examiner

CAPACITOR VOLTAGE BALANCING TECHNIQUES FOR MULTI-LEVEL DUAL ACTIVE BRIDGE CONVERTER

TECHNICAL FIELD

This disclosure relates generally to DC/DC converters and, more particularly, to capacitor voltage balancing techniques for dual active bridge converters.

BACKGROUND

A dual active bridge converter is a type of power electronics converter that facilitates the transformation of electrical power from one DC voltage level to a different DC voltage level. Dual active bridge converters are frequently used in a broad range of applications, such as energy storage systems, renewable energy systems, and electric vehicle chargers.

In a dual active bridge converter, there are two active bridges: one on the primary side (usually connected to a source) and one on the secondary side (usually connected to a load). Each bridge includes a number of active switches, e.g., IGBTs or MOSFETs, depending on the design and application. These active switches are used to create a high frequency AC voltage from the DC source, which is then transformed and rectified to a DC voltage at a different level. The name "dual active bridge" comes from the fact that there are two active bridges, one on each side of a high frequency transformer. This setup allows bidirectional power flow.

U.S. Pat. No. 10,554,144 relates to a method of controlling a Solid State Transformer (SST). The method comprises dividing a dual active bridge (DAB) power reference on a Low Voltage (LV) side Direct Current (DC) link voltage to obtain a total DAB reference current; dividing the total DAB current reference by N number of DAB modules to obtain a reference current for each DAB module; in response to SST being in a normal power regulation, determining a deviation of a capacitor voltage at the HV side of each of a k DAB modules with reference from an average voltage from the HV DC bus; determining a current adjustment signal for each of the k DAB modules based on the total DAB reference current and a corresponding deviation of the capacitor voltage of each of the k DAB modules; adding a saturated current adjustment signal together with the reference current for each of the k DAB modules to obtain a total current reference for each of the k DAB modules; and subtracting a sum of the total current reference of each of the k DAB modules from the total DAB reference current to determine a total current reference for an $N^{th}$ DAB module.

SUMMARY

This disclosure describes capacitor voltage balancing techniques for a 3-level 3-level dual-active-bridge converter that controls the duration of a zero voltage state of the low voltage (LV) and medium (MV) side transformer voltages based on a voltage difference between the upper and lower capacitors of both the LV and MV sides independently, the power delivered (P), and the LV and MV DC voltages. This control varies the angle to maintain the power requirement, which induces the additional voltage drop across the transformer inductance to produce the required current to flow through the capacitors and balance the capacitor voltages.

In some aspects, this disclosure is directed to a method for balancing capacitor voltage in a multilevel dual active bridge converter, wherein the dual active bridge converter includes a first full bridge circuit having a first plurality of electronic switches, the first full bridge circuit configured to generate a first group of three voltage levels including a first DC voltage level, a one-half first DC voltage level, and a first zero voltage level, a second full bridge circuit including a second plurality of electronic switches, the second full bridge circuit configured to generate a second group of three voltage levels including a second DC voltage level, a one-half second DC voltage level, and a second zero voltage level, a transformer coupled between the first full bridge circuit and the second full bridge circuit, and an inductor coupled between the first full bridge circuit and a primary winding of the transformer, the method comprising: determining a first capacitor voltage difference between a first capacitor voltage and a second capacitor voltage of the first full bridge circuit; determining a first zero voltage level correction value based on the first capacitor voltage difference; adjusting an internal phase shift value corresponding to a duration of the first zero voltage level based on the first zero voltage level correction value; and adjusting, based on the adjusted internal phase shift value corresponding to a duration of the first zero voltage level, a timing of the first plurality of electronic switches to reduce the first capacitor voltage difference between the first capacitor voltage and the second capacitor voltage of the first full bridge circuit.

In some aspects, this disclosure is directed to a multilevel dual active bridge converter configured for balancing capacitor voltage, the multilevel dual active bridge converter comprising: a first full bridge circuit having a first plurality of electronic switches, the first full bridge circuit configured to generate a first group of three voltage levels including a first DC voltage level, a one-half first DC voltage level, and a first zero voltage level; a second full bridge circuit including a second plurality of electronic switches, the second full bridge circuit configured to generate a second group of three voltage levels including a second DC voltage level, a one-half second DC voltage level, and a second zero voltage level; a transformer coupled between the first full bridge circuit and the second full bridge circuit; an inductor coupled between the first full bridge circuit and a primary winding of the transformer; and a control circuit configured for: determining a first capacitor voltage difference between a first capacitor voltage and a second capacitor voltage of the first full bridge circuit; determining a first zero voltage level correction value based on the first capacitor voltage difference; adjusting an internal phase shift value corresponding to a duration of the first zero voltage level based on the first zero voltage level correction value; and adjusting, based on the adjusted internal phase shift value corresponding to a duration of the first zero voltage level, a timing of the first plurality of electronic switches to reduce the first capacitor voltage difference between the first capacitor voltage and the second capacitor voltage of the first full bridge circuit.

In some aspects, this disclosure is directed to a control circuit configured for balancing capacitor voltage in a multilevel dual active bridge converter, wherein the dual active bridge converter includes a first full bridge circuit having a first plurality of electronic switches, the first full bridge circuit configured to generate a first group of three voltage levels including a first DC voltage level, a one-half first DC voltage level, and a first zero voltage level, a second full bridge circuit including a second plurality of electronic switches, the second full bridge circuit configured to generate a second group of three voltage levels including a second DC voltage level, a one-half second DC voltage level, and a second zero voltage level, a transformer coupled between the first full bridge circuit and the second full bridge circuit, and an inductor coupled between the first full bridge circuit and a primary winding of the transformer, the control circuit configured to perform operations comprising: determining a first capacitor voltage difference between a first capacitor voltage and a second capacitor voltage of the first full bridge circuit; determining a first zero voltage level correction value based on the first capacitor voltage difference; adjusting an internal phase shift value corresponding to a duration of the first zero voltage level based on the first zero voltage level correction value; and adjusting, based on the adjusted internal phase shift value corresponding to a duration of the first zero voltage level, a timing of the first plurality of electronic switches to reduce the first capacitor voltage difference between the first capacitor voltage and the second capacitor voltage of the first full bridge circuit.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A 3-level 3-level dual-active-bridge converter is often a desirable choice for high-voltage applications such as Battery Energy Storage Systems (BESS) and electric large mining trucks (e-LMTs). However, the neutral point clamping (NPC) topology can be subjected to capacitor voltage imbalances from time to time due to non-ideal operating conditions. Capacitor voltage imbalance can lead to negative consequences in a 3-level 3 level DAB converter, some which are listed below.

Capacitor voltage imbalance refers to an uneven distribution of voltage or energy storage among the capacitors used in the converter circuit, which can lead to a significant reduction in the converter's efficiency. Capacitor voltage imbalance can cause an increase in the voltage stress on the capacitors, which can lead to premature failure. Unbalanced capacitors can cause an increase in the output voltage ripple, which can that affect the performance of the converter. Capacitor voltage imbalance can cause transformer saturation that, in turn, increases the temperature in the core of the transformer, which can lead to failure of the transformer.

One approach to address the issue of capacitor imbalance in 3-level 3-level DAB uses a balancing switching scheme, such as complementary switching-state (CSS) method. The CSS method minimizes power fluctuation and determines the transformer current polarity, but uses a different switching sequence for balanced and unbalanced conditions. However, it may be complex to deploy a solution that alters switching sequences, such as the CSS method. Another approach uses passive capacitor voltage balancing and involves the use of additional passive components to balance the voltage across the capacitors. The present inventors have recognized a need for an easy-to-deploy solution to capacitor voltage imbalance for 3-level 3-level dual active bridge converters.

This disclosure describes capacitor voltage balancing techniques for a 3-level 3-level dual-active-bridge converter that controls the duration of a zero voltage state of the low voltage (LV) and medium (MV) side transformer voltages based on a voltage difference between the upper and lower capacitors of both the LV and MV sides independently, the power delivered (P), and the LV and MV DC voltages. This control varies the angle to maintain the power requirement, which induces the additional voltage drop across the transformer inductance to produce the required current to flow through the capacitors and balance the capacitor voltages.

Figure 1:
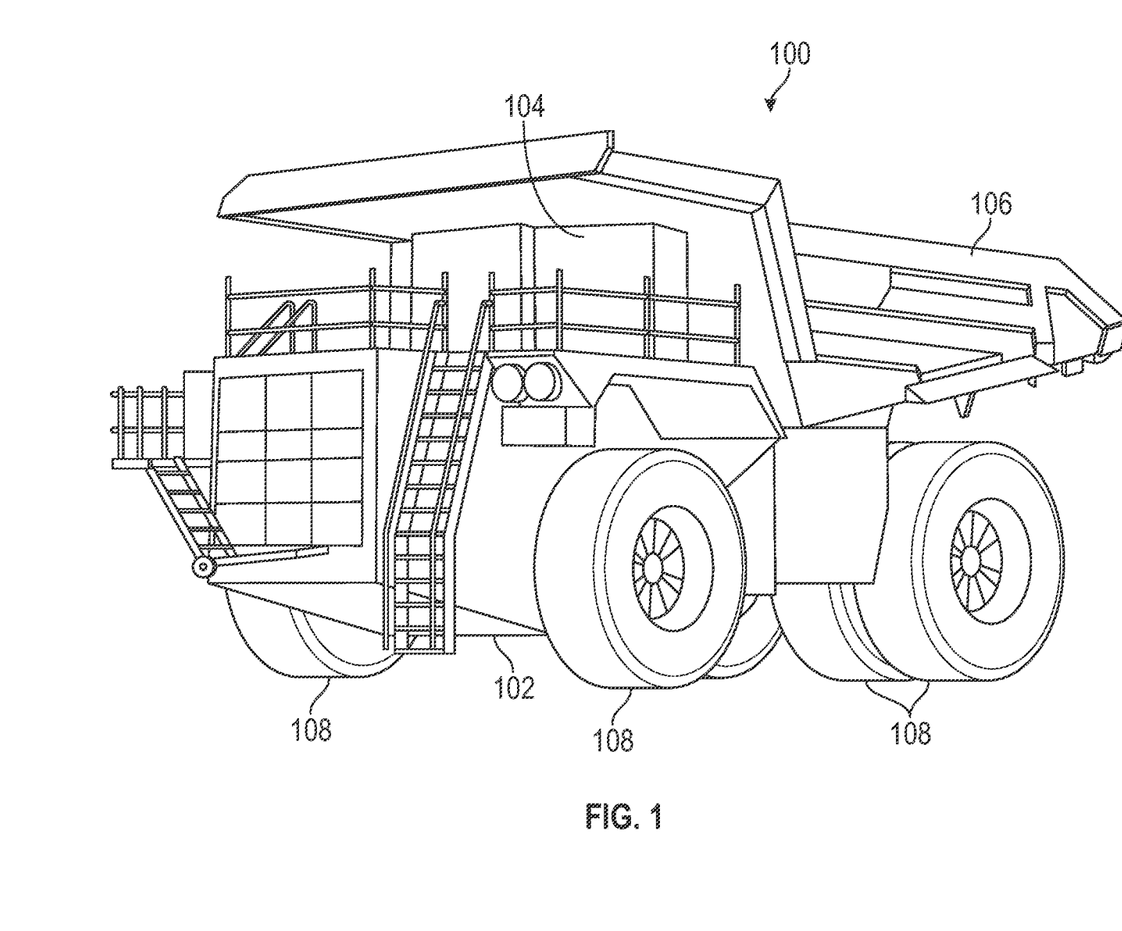
FIG. 1 is a perspective view of an example of an electric machine that can implement various dual active bridge converter techniques of this disclosure.

FIG. 1 is a perspective view of an example of an electric machine that can implement various dual active bridge DC converter techniques of this disclosure. A non-limiting example of an electric machine 100 is shown in FIG. 1. The electric machine 100 can be any stationary, or mobile, machine powered, at least partially, by batteries, as will be described below with reference to FIG. 2. The electric machine 100 can be a mining truck, as depicted, or may alternatively embody an on-highway or off-highway machine or any other vehicle that is configured to be propelled. In some examples, the electric machine 100 includes a frame 102 supporting at least an operator control station 104 and a dump body 106. Ground-engaging elements 108, such as tracks, wheels and/or tires, may also be supported by the frame 102, and can be powered by a drive system, discussed below, supported by the frame 102.

Figure 2:
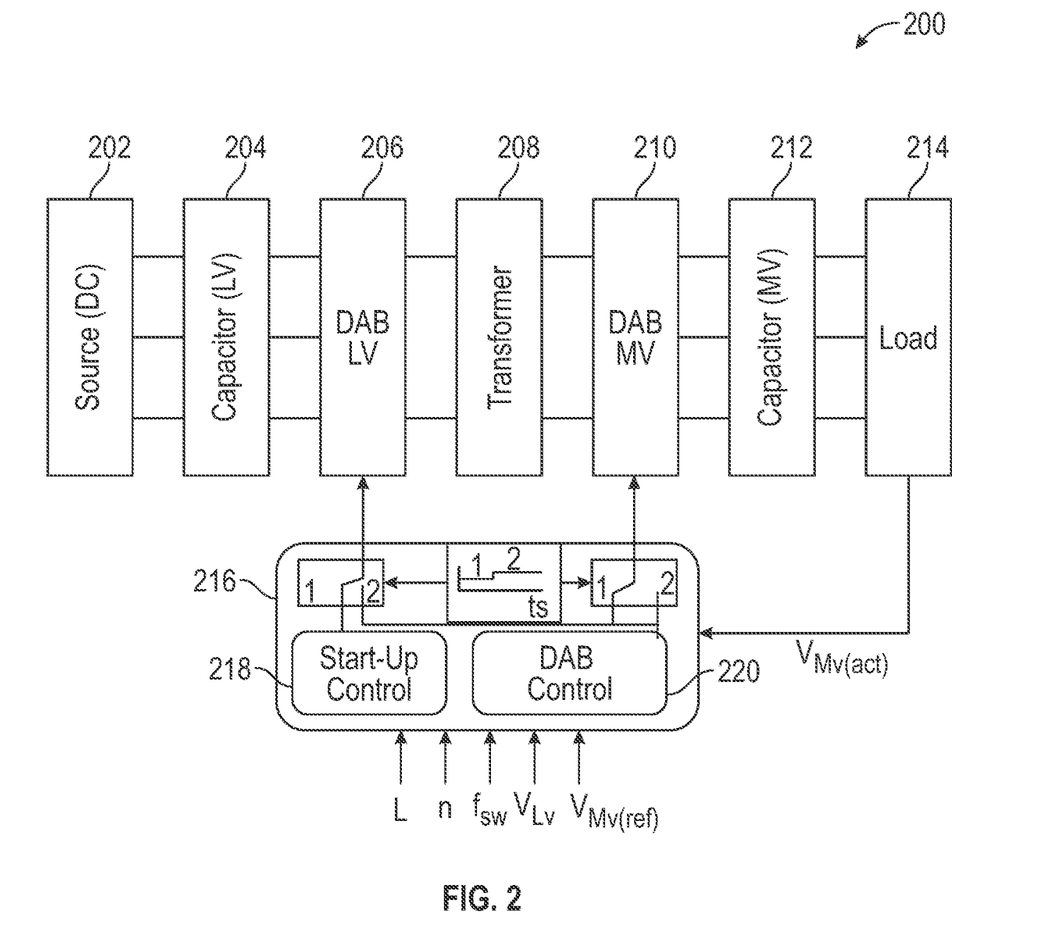
FIG. 2 is a diagrammatic view of an example of an electric powertrain using the dual active bridge converter of this disclosure.

FIG. 2 is a diagrammatic view of an example of an electric powertrain using the dual active bridge converter of this disclosure. The powertrain 200 can be used in combination with an electric machine, such as the electric machine 100 of FIG. 1. In the example shown, the powertrain 200 includes a DC power source 202, such as one or more battery modules that each include one or more battery cells. The DC power source 202 is electrically coupled with capacitors 204. The capacitors 204 are electrically coupled with a first full bridge circuit 206. A transformer 208 is electrically coupled between the first full bridge circuit 206 and a second full bridge circuit 210. The second full bridge circuit 210 is electrically coupled with capacitors 212, and an electrically drivable load 214, such as a motor of an electric machine, is electrically coupled with the capacitors 212. The dual active bridge converter includes the first full bridge circuit 206, the transformer 208, and the second full bridge circuit 210 and is controlled by a control circuit 216.

The control circuit 216 is electrically coupled with the first full bridge circuit 206 and the second full bridge circuit 210 and configured to control operation of one or more electronic switches, e.g., insulated-gate bipolar transistors (IGBT), of each of the first full bridge circuit 206 and the second full bridge circuit 210. The control circuit 216 can include start-up control circuit 218 and a dual active bridge converter control circuit 220. The control circuit 216 is configured to receive various inputs including an inductance (L) of an inductor coupled with the transformer 208, a number of turns (n) of the transformer 208, a switching frequency ($f_{sw}$) at which the switches should be operated, a voltage ($V_{LV}$) of the first full bridge circuit 206, a reference voltage ($V_{MV(ref)}$) of the second full bridge circuit 210, and an actual voltage ($V_{MV(act)}$) of the second full bridge circuit 210, as fed back from the electrically drivable load 214.

Figure 3:
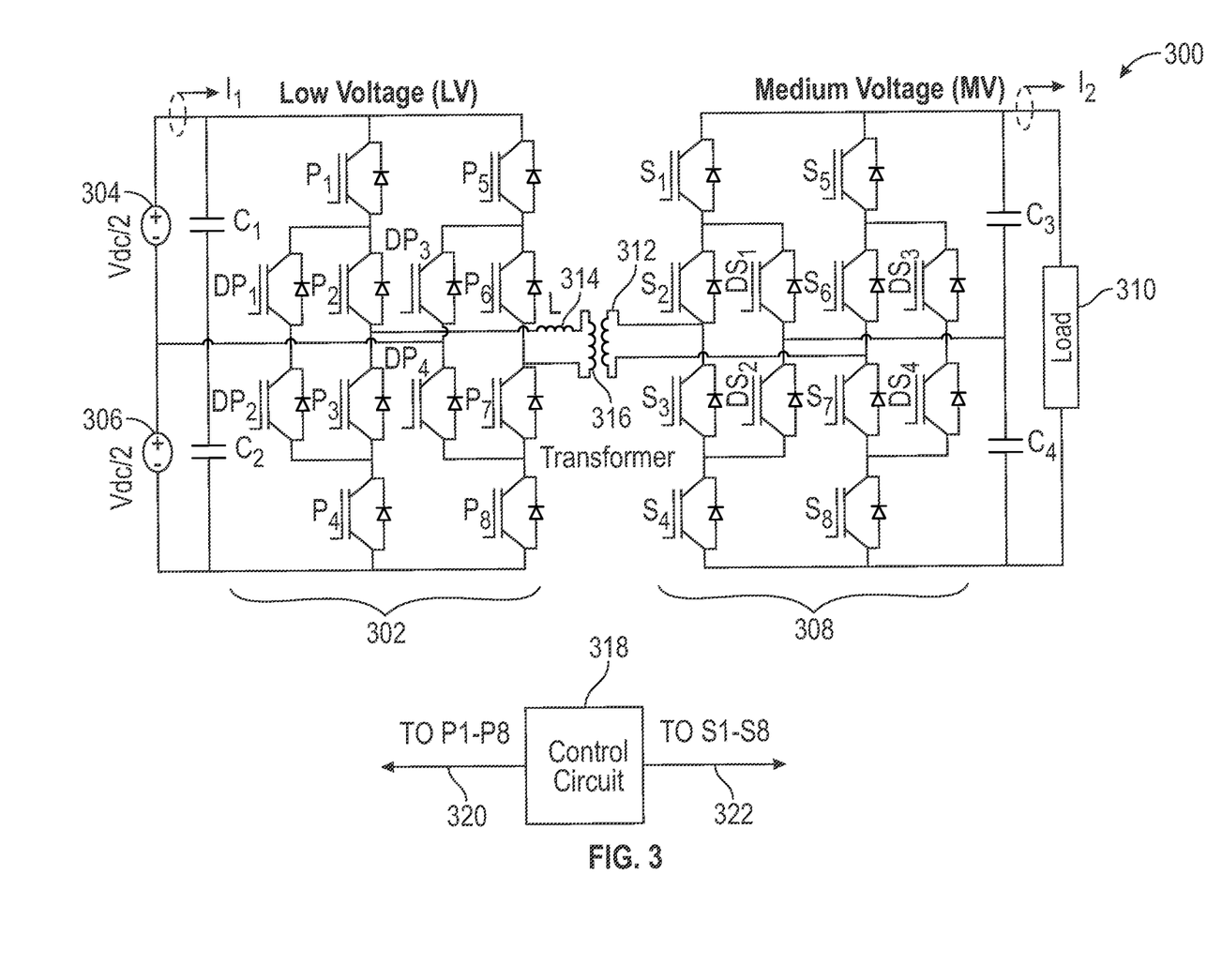
FIG. 3 is a schematic illustration of a multilevel dual active bridge converter 300 that can be used by the machine of FIG. 1.

FIG. 3 is a schematic illustration of a multilevel dual active bridge converter 300 that can be used by the machine of FIG. 1. The multilevel dual active bridge converter 300 of FIG. 3 can be a 3-Level 3-Level converter or higher (n-Level n-Level). The dual active bridge converter 300 includes a first full bridge circuit 302, such as the first full bridge circuit 206 of FIG. 2. The first full bridge circuit 302 is configured to generate a first group of three voltage levels including a first DC voltage level, a one-half first DC voltage level, and a first zero voltage level.

The first full bridge circuit 302 is electrically coupled with a first capacitor C1 and a second capacitor C2, such as the capacitors 204 of FIG. 2. The first capacitor C1 is electrically coupled with a first DC source 304 and the second capacitor C2 is electrically coupled with a second DC source 306, such as the DC power source 202 of FIG. 2.

The dual active bridge converter 300 includes a second full bridge circuit 308, such as the second full bridge circuit 210 of FIG. 2. The second full bridge circuit 308 is configured to generate a second group of three voltage levels including a second DC voltage level, a one-half second DC voltage level, and a second zero voltage level. In some examples, the first DC voltage level is less than the second DC voltage level.

The second full bridge circuit 308 is electrically coupled with a third capacitor C3 and a fourth capacitor C4, such as the capacitors 212 of FIG. 2. The third capacitor C3 and the fourth capacitor C4 are electrically coupled with a load 310, such as the electrically drivable load 214 of FIG. 2.

A transformer 312 having a turns ratio n is electrically coupled between the first full bridge circuit 302 and the second full bridge circuit 308. An inductor 314 having an inductance L is electrically coupled between the first full bridge circuit 302 and a primary winding 316 of the transformer 312.

In this disclosure, the first full bridge circuit 302 is referred to as the low voltage (LV) side (e.g., primary side) and the second full bridge circuit 308 is referred to as the medium voltage (MV) side (e.g., secondary side), meaning that the first full bridge circuit 302 outputs a voltage that is lower than the voltage output by the second full bridge circuit 308. It should be noted that the dual active bridge converter 300 is a bidirectional device such that either full bridge circuit can generate and supply power to the other full bridge circuit.

The first full bridge circuit 302 includes a first plurality of electronic switches, namely switches P1-P8, e.g., IGBTs, and includes a plurality of clamping diodes, namely diodes DP1-DP4. Similarly, the second full bridge circuit 308 includes a second plurality of electronic switches, namely switches S1-S8, and includes a plurality of clamping diodes, namely diodes DS1-DS4.

A control circuit 318, such as the control circuit 216 of FIG. 2, can output various control signals 320 to the electronic switches P1-P8 to control their switching operation. Similarly, the control circuit 318 can output various control signals 322 to the electronic switches S1-S8 to control their switching operation. Various inputs can be applied to the start-up control circuit 218 of the control circuit 318 to generate those control signals, including:

1. δ, which is the phase shift angle value that corresponds to a time difference between a midpoint of a duration of the first DC voltage level and a midpoint of a duration of the second DC voltage level and determines a power transfer;
2. α_1, which is an internal phase shift value of the LV side corresponding to a duration of a first zero voltage level (0 voltage state);
3. α_2, which is an internal phase shift value of the LV side corresponding to a duration of one-half the first DC voltage level (+/−Vdc/2 state);
4. β_1, which is an internal phase shift value of the MV side corresponding to a duration of a second zero voltage level (0 voltage state); and
5. β_2, which is an internal phase shift value of the MV side corresponding to a duration of one-half the second DC voltage level (+/−Vdc/2 state).

By using various techniques described below, the control circuit 318 can vary the internal phase shift value α_1, which induces an additional voltage drop across the inductor 314 coupled with the transformer 312 to produce the current required to flow through the capacitors, e.g., the capacitors C1 and C2, and balance the capacitor voltages.

Figure 4:
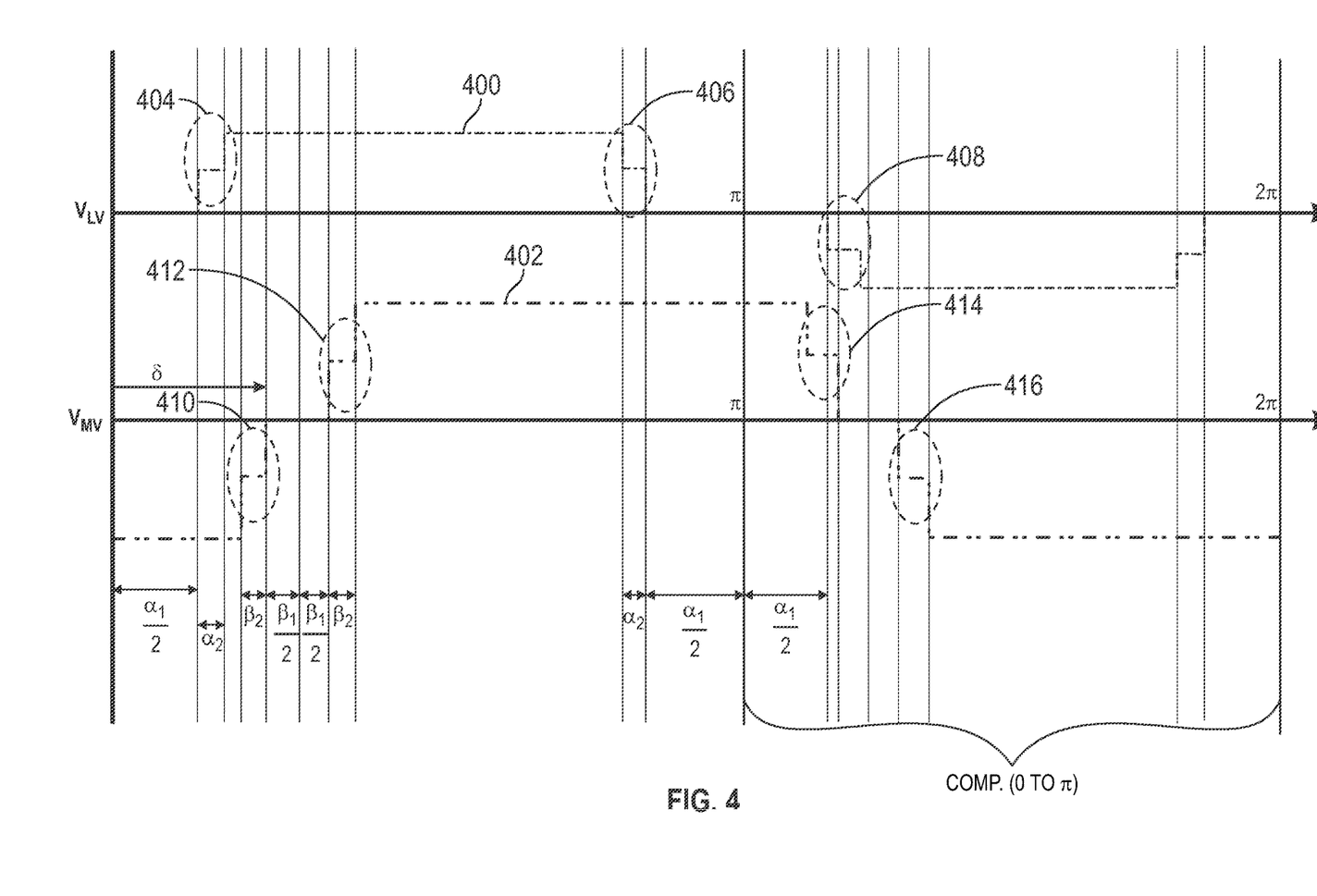
FIG. 4 graphically depicts the output voltage waveforms of the first full bridge circuit and the second full bridge circuit of the multilevel dual active bridge converter and illustrates the associated phase shifts.

FIG. 4 graphically depicts the output voltage waveforms of the first full bridge circuit and the second full bridge circuit of the multilevel dual active bridge converter and illustrates the associated phase shifts. The x-axis represents time and the y-axis represents voltage. The first full bridge circuit, such as the first full bridge circuit 302 of FIG. 3, outputs a voltage waveform 400 ($V_{LV}$) having an α_1 state, which is the duration of the zero voltage state. The α_2 state is the duration of the next voltage level. These durations are a function of a switching frequency controlled by the control circuit.

The second full bridge circuit, such as the second full bridge circuit 308 of FIG. 3, outputs a voltage waveform 402 having a β_1 state, which is the duration of the zero voltage state. The β_2 state is the duration of the next voltage level. These durations are a function of a switching frequency controlled by the control circuit. The phase shift angle value δ corresponds to a time difference between a midpoint of a duration of the first DC voltage level and a midpoint of a duration of the second DC voltage level and determines a power transfer.

Capacitor voltage imbalance can occur at a first Vdc/2 state 404, a second Vdc/2 state 406, and a third Vdc/2 state 408 of the $V_{LV}$ voltage waveform 400. Similarly, capacitor voltage imbalance can occur at a first Vdc/2 state 410, a second Vdc/2 state 412, a third Vdc/2 state 414, and a fourth Vdc/2 state 416 of the $V_{MV}$ voltage waveform 402.

Figure 5:
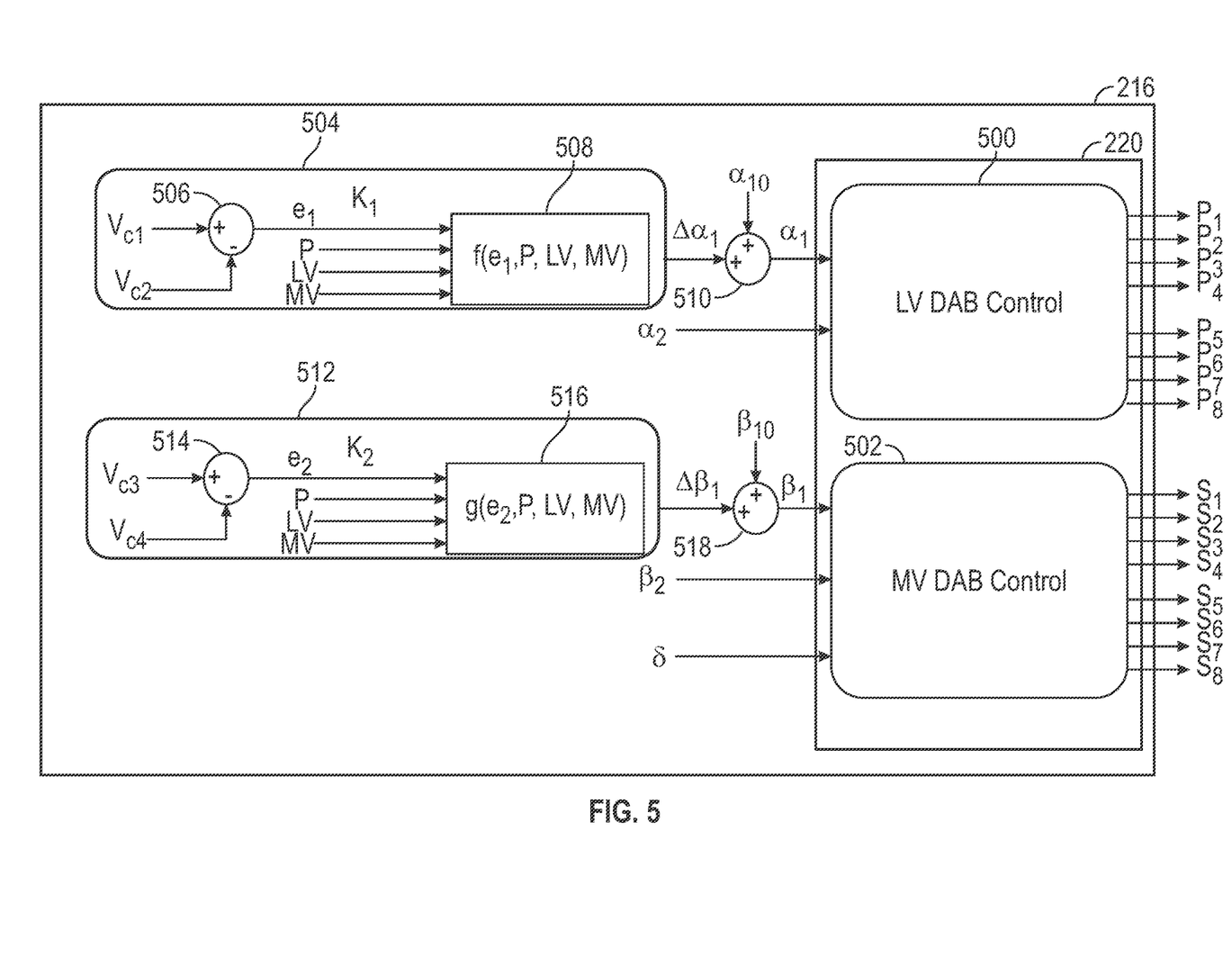
FIG. 5 is a diagrammatic view depicting the control circuit of FIG. 2 receiving various inputs to control operation of the multilevel dual active bridge converter of this disclosure.

FIG. 5 is a diagrammatic view depicting the control circuit of FIG. 2 receiving various inputs to control operation of the multilevel dual active bridge converter of this disclosure. The dual active bridge converter control circuit 220 of the control circuit 216 includes an LV dual active bridge converter control circuit 500 and an MV dual active bridge converter control circuit 502. The LV dual active bridge converter control circuit 500 is configured to receive $\alpha\_1$ and $\alpha\_2$ and, in response, generate the control signals 320 of FIG. 3 to control the operation of the switches P1-P8 of the first full bridge circuit 302 of FIG. 3. Similarly, the MV dual active bridge converter control circuit 502 is configured to receive $\beta\_1$, $\beta\_2$, and $\delta$ and, in response, generate the control signals 322 of FIG. 3 to control the operation of the switches S1-S8 of the second full bridge circuit 308 of FIG. 3.

The value of $\alpha\_1$ is generated using a first zero voltage level correction value control circuit 504 (also labeled K1). A capacitor voltage (VC1) of the capacitor C1 of FIG. 3 and a capacitor voltage (VC2) of the capacitor C2 of the first full bridge circuit 302 of FIG. 3 are applied to a subtraction circuit 506 to determine a first capacitor voltage difference e1. The first capacitor voltage difference e1 is applied to a first controller 508. In addition, a value of a power transfer P (where P is the voltage LV multiplied by a current I1 in FIG. 3, such as measured by a current sensor), the LV voltage, and the MV voltage are applied to the first controller 508, such as a proportional-integral (PI) controller or lookup table. In this manner, the control circuit 216 can determine the first zero voltage level correction value $\alpha\_1$ based on 1) the first capacitor voltage difference, 2) the first power transfer value, 3) the first DC voltage level LV and 4) the second DC voltage level MV, shown as $\Delta\alpha\_1$. The value of $\Delta\alpha\_1$ represents a correction that is needed to the first zero voltage state, which can vary dynamically.

The value of $\Delta\alpha\_1$ and a value of an uncorrected (e.g., conventional) zero voltage state level $\alpha\_10$ are applied to a subtraction circuit 510, and the subtraction circuit 510 generates an adjusted internal phase shift value $\alpha\_1$, which corresponds to a desired duration of the first zero voltage level. Then, the LV dual active bridge converter control circuit 500 adjusts, based on the adjusted internal phase shift value corresponding to a duration of the first zero voltage level, a timing of the first plurality of electronic switches P1-P8 to reduce the first capacitor voltage difference between the first capacitor voltage VC1 and the second capacitor voltage VC2 of the first full bridge circuit. In this manner, the control circuit 216 can increase a magnitude of a first current flowing into the first capacitor C1 and the second capacitor C2 respectively, to reduce the first capacitor voltage difference between the first capacitor voltage VC1 and the second capacitor voltage VC2 of the first full bridge circuit.

In some examples, the LV dual active bridge converter control circuit 500 receives $\alpha\_2$, which is an internal phase shift value corresponding to a duration of the one-half first DC voltage level, and adjusts, based on the internal phase shift value corresponding to a duration of the one-half first DC voltage level, the timing of the first plurality of electronic switches P1-P8.

The value of $\beta\_1$ is generated using a second zero voltage level correction value control circuit 512 (also labeled K2). A capacitor voltage (VC3) of the capacitor C3 of FIG. 3 and a capacitor voltage (VC4) of the capacitor C4 of the second full bridge circuit 308 of FIG. 3 are applied to a subtraction circuit 514 to determine a second capacitor voltage difference e2. The second capacitor voltage difference e2 is applied to a second controller 516. In addition, a value of a power transfer P (where P is the voltage MV multiplied by a current I2 in FIG. 3, such as measured by a current sensor), the LV voltage, and the MV voltage are applied to the second controller 516, such as a proportional-integral (PI) controller or a lookup table. In this manner, the second controller 516 can determine the second zero voltage level correction value $\beta\_1$ based on 1) the second capacitor voltage difference, 2) the second power transfer value, 3) the first DC voltage level LV and 4) the second DC voltage level MV, shown as $\Delta\beta\_1$.

The value of $\Delta\beta\_1$ represents a correction that is need to the second zero voltage state, which can vary dynamically. The value of $\Delta\beta\_1$ and a value of an uncorrected (e.g., conventional) zero voltage state $\beta\_10$ are applied to a subtraction circuit 518, and the subtraction circuit 518 generates an adjusted internal phase shift value $\beta\_1$, which corresponds to a desired duration of the second zero voltage level. Then, the MV dual active bridge converter control circuit 502 adjusts, based on the adjusted internal phase shift value corresponding to a duration of the second zero voltage level, a timing of the second plurality of electronic switches S1-S8 to reduce the first capacitor voltage difference between the first capacitor voltage VC3 and the second capacitor voltage VC4 of the second full bridge circuit.

In some examples, the MV dual active bridge converter control circuit 502 receives $\beta\_2$, which is an internal phase shift value corresponding to a duration of the one-half second DC voltage level and adjusts, based on the internal phase shift value corresponding to a duration of the one-half second DC voltage level, the timing of the second plurality of electronic switches S1-S8.

In some examples, the MV dual active bridge converter control circuit 502 receives $\delta$, which is a phase shift angle value corresponding to a time difference between a midpoint of a duration of the first DC voltage level and a midpoint of a duration of the second DC voltage level and adjusts the timing of the second plurality of electronic switches S1-S8 based on the phase shift angle value.

These techniques increase the duration of the LV and MV zero voltage states in LV by increasing the overall net $\alpha\_1$ value and $\beta\_1$ value through the K1 and K2 controllers. As the control circuit 216 increases the duration of the zero voltage states to deliver the desired power, the value of $\delta$ is increased as a result of the increase to the duration of the zero voltage state, which induces an additional voltage drop across the inductor 314 of FIG. 3 to produce the current that is required to flow through the capacitors and balance the capacitor voltages.

Figure 6:
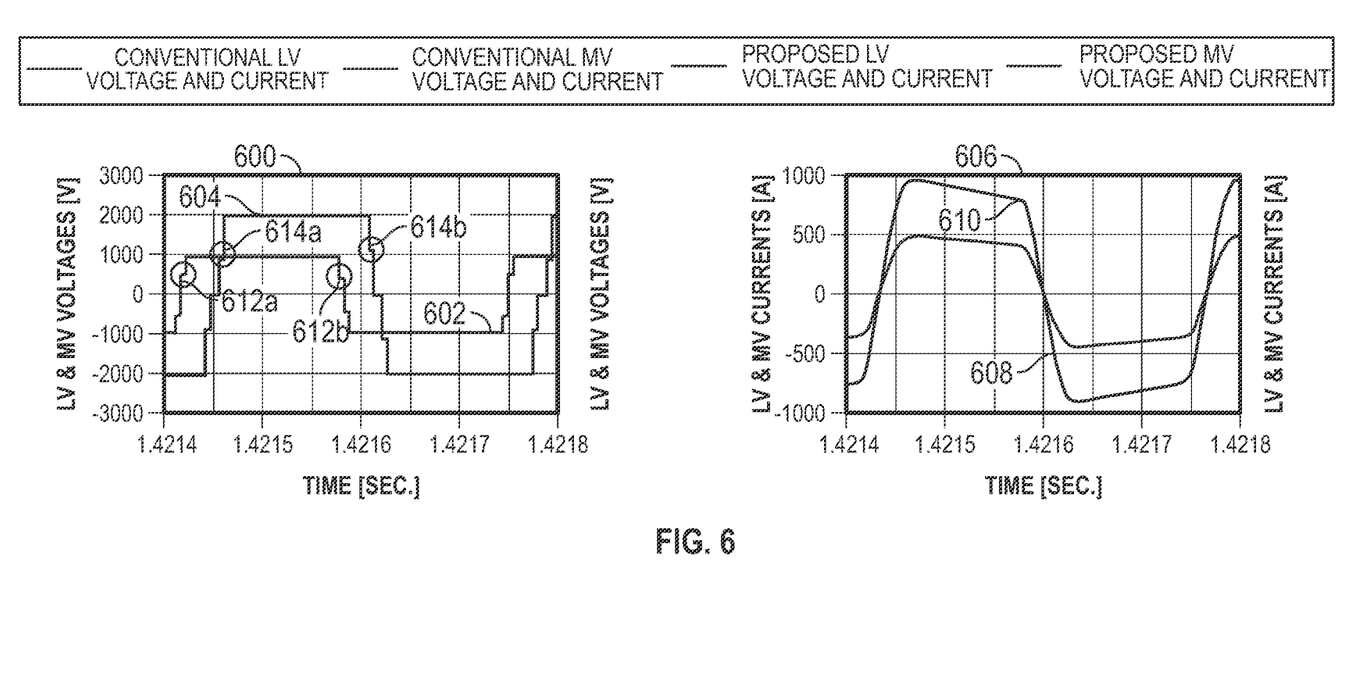
FIG. 6 illustrates an aspect of the subject matter in accordance with one embodiment.

FIG. 6 graphically depicts simulation results of capacitor voltages in an imbalanced state in both the LV and MV first full bridge circuits. The top graph 600 depicts an LV voltage waveform 602 and an MV voltage waveform 604. The x-axis represents time in seconds and the y-axis represents voltage in volts.

The bottom graph 606 depicts an LV current waveform 608 and an MV current waveform 610. The x-axis represents time in seconds and the y-axis represents current in amps. In the imbalanced state shown in FIG. 6, both the capacitor C1 and the capacitor C2 of FIG. 3 were imbalanced. Various regions of imbalance are depicted in FIG. 6. For example, LV imbalance is shown at 612*a* and 612*b*, where the voltage level at 612*a* is higher than the voltage level at 612*b*. Similarly, MV imbalance is shown at 614*a* and 614*b*, where the voltage level at 614*a* is lower than the voltage level at 614*b*.

Figure 7:
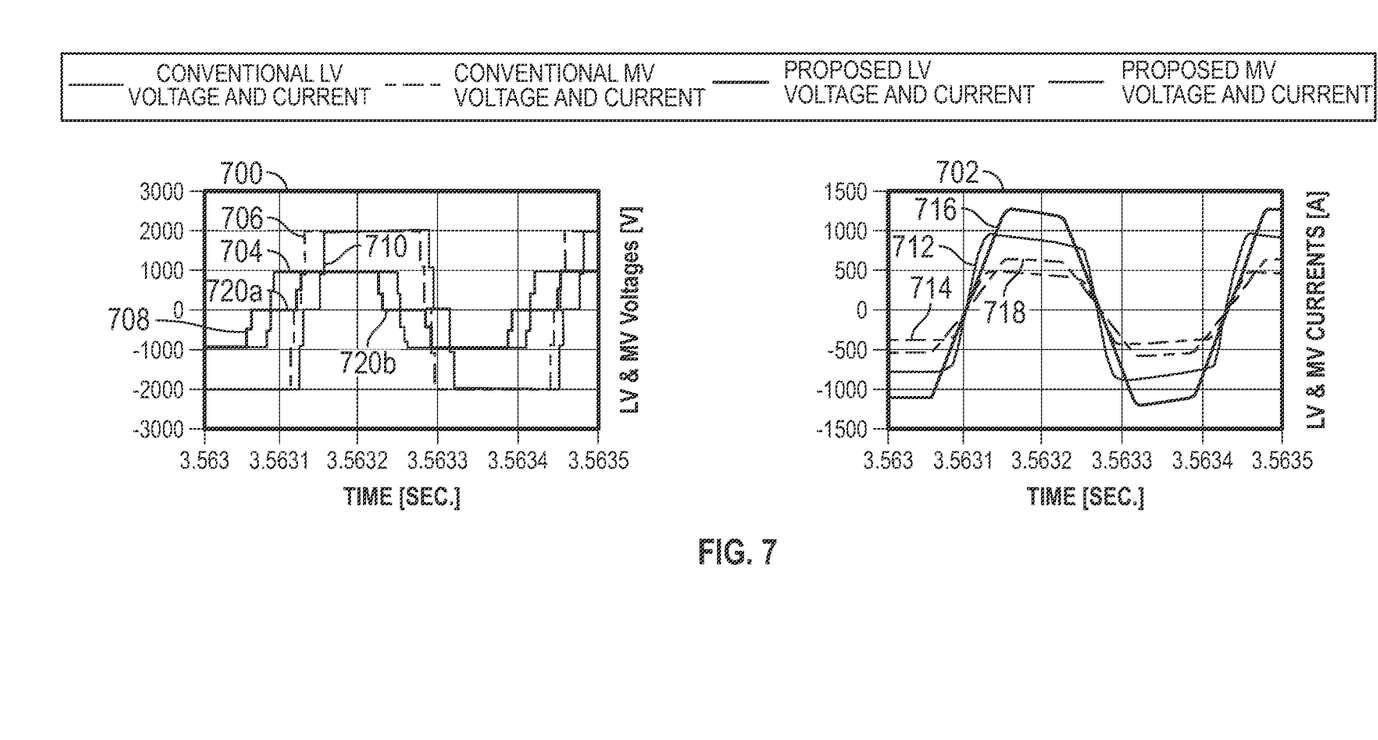
FIG. 7 graphically depicts simulation results of capacitor voltages in both the LV and MV first full bridge circuits during a transition between the imbalanced state of FIG. 6 and a balanced state of FIG. 8.
Figure 8:
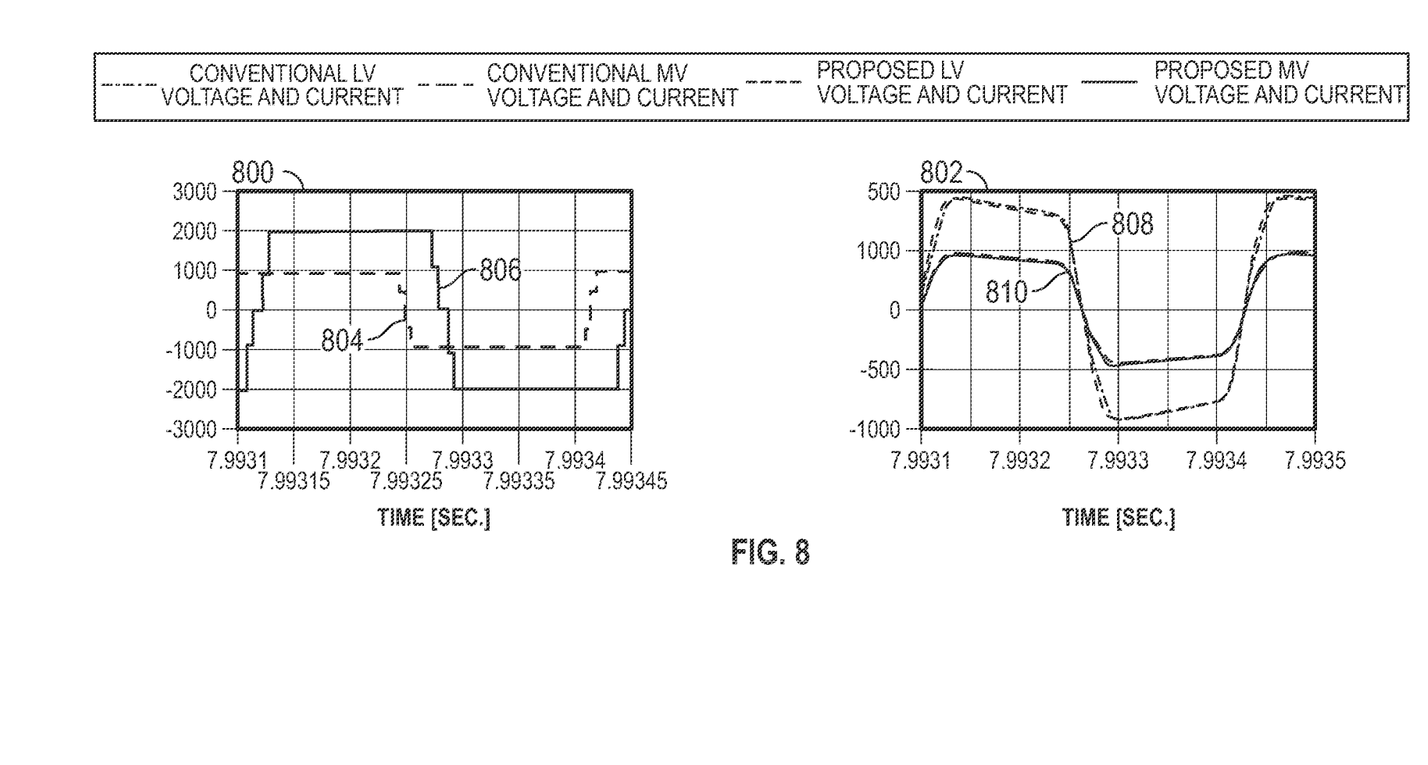
FIG. 8 graphically depicts simulation results of capacitor voltages in a balanced state in both the LV and MV first full bridge circuits using the techniques of this disclosure.

FIG. 7 graphically depicts simulation results of capacitor voltages in both the LV and MV first full bridge circuits during a transition between the imbalanced state of FIG. 6 and a balanced state of FIG. 8. The top graph 700 depicts a conventional LV voltage waveform 704 and a conventional MV voltage waveform 706 overlaid with a proposed LV voltage waveform 708 and a proposed MV voltage waveform 710, using the techniques of this disclosure. The x-axis represents time in seconds and the y-axis represents voltage in volts. As seen in the top graph 700, the LV imbalance, for example, has been corrected at 720a and 720b, where the voltage level at 720a is the same level as the voltage level at 720b. Similarly, MV imbalance has similarly been corrected.

The bottom graph 702 depicts a conventional LV current waveform 712 and a conventional MV current waveform 714 overlaid with a proposed LV current waveform 716 and a proposed MV current waveform 718, using the techniques of this disclosure. The x-axis represents time in seconds and the y-axis represents voltage in volts. During balancing, the control circuit increases the duration of zero voltage state for both LV and MV voltages to balance the capacitors. There is an increase in the amplitude of the current on both LV and MV sides during balancing.

FIG. 8 graphically depicts simulation results of capacitor voltages in a balanced state in both the LV and MV first full bridge circuits using the techniques of this disclosure. The top graph 800 depicts a proposed LV voltage waveform 804 and a proposed MV voltage waveform 806 using the techniques of this disclosure. The x-axis represents time in seconds and the y-axis represents voltage in volts. The bottom graph 802 depicts a proposed LV current waveform 808 and a proposed MV current waveform 810 overlaid with the conventional current waveforms shown in dashed line.

In the balanced state shown in the top graph 800 of FIG. 8, the zero voltage state has been eliminated from the LV side.

Figure 9:
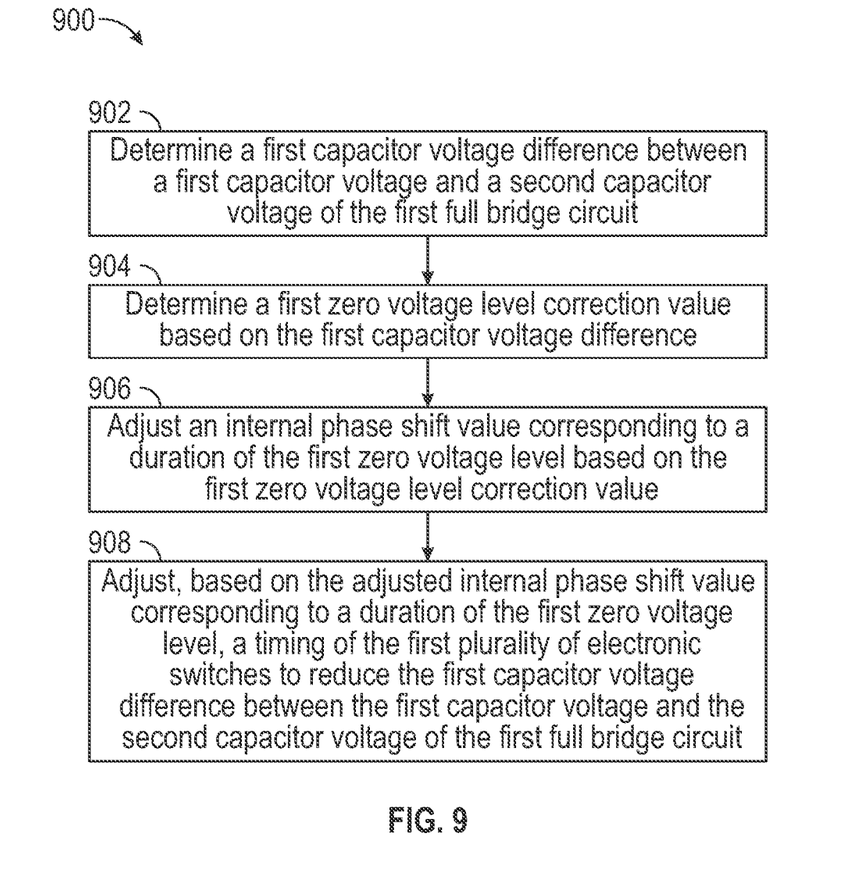
FIG. 9 is a flow diagram depicting an example of a method for balancing capacitor voltage in a multilevel dual active bridge converter.

FIG. 9 is a flow diagram depicting an example of a method for balancing capacitor voltage in a multilevel dual active bridge converter. The multilevel dual active bridge converter includes a first full bridge circuit having a first plurality of electronic switches, where the first full bridge circuit are configured to generate a first group of three voltage levels including a first DC voltage level, a one-half first DC voltage level, and a first zero voltage level. The multilevel dual active bridge converter includes a second full bridge circuit including a second plurality of electronic switches, where the second full bridge circuit are configured to generate a second group of three voltage levels including a second DC voltage level, a one-half second DC voltage level, and a second zero voltage level. The multilevel dual active bridge converter includes a transformer coupled between the first full bridge circuit and the second full bridge circuit, and an inductor coupled between the first full bridge circuit and a primary winding of the transformer.

In block 902, the method 900 determines a first capacitor voltage difference between a first capacitor voltage and a second capacitor voltage of the first full bridge circuit.

In block 904, the method 900 determines a first zero voltage level correction value based on the first capacitor voltage difference.

In block 906, the method 900 adjusts an internal phase shift value corresponding to a duration of the first zero voltage level based on the first zero voltage level correction value.

In block 908, the method 900 adjusts, based on the adjusted internal phase shift value corresponding to a duration of the first zero voltage level, a timing of the first plurality of electronic switches to reduce the first capacitor voltage difference between the first capacitor voltage and the second capacitor voltage of the first full bridge circuit, such as by increasing a magnitude of a first current flowing into a first capacitor and a second capacitor, respectively, to reduce the first capacitor voltage difference between the first capacitor voltage and the second capacitor voltage of the first full bridge circuit.

In some examples the method 900 includes determining a first power transfer value, wherein determining the first zero voltage level correction value based on the first capacitor voltage difference includes: determining the first zero voltage level correction value based on 1) the first capacitor voltage difference, 2) the first power transfer value, 3) the first DC voltage level, and 4) the second DC voltage level.

In some examples the method 900 includes receiving an internal phase shift value corresponding to a duration of the one-half first DC voltage level and adjusting, based on the internal phase shift value corresponding to a duration of the one-half first DC voltage level, the timing of the first plurality of electronic switches.

In some examples the method 900 includes determining a second capacitor voltage difference between a third capacitor voltage VC3 and a fourth capacitor voltage VC4 of the second full bridge circuit; determining a second zero voltage level correction value based on the second capacitor voltage difference; adjusting an internal phase shift value corresponding to a duration of the second zero voltage level based on the second zero voltage level correction value; and adjusting, based on the adjusted internal phase shift value corresponding to a duration of the second zero voltage level, a timing of the second plurality of electronic switches to reduce the second capacitor voltage difference between the third capacitor voltage and the fourth capacitor voltage of the second full bridge circuit.

In some examples the method 900 includes receiving an internal phase shift value corresponding to a duration of the one-half second DC voltage level, and adjusting, based on the internal phase shift value corresponding to a duration of the one-half second DC voltage level, the timing of the second plurality of electronic switches.

In some examples the method 900 includes receiving a phase shift angle value corresponding to a time difference between a midpoint of a duration of the first DC voltage level and a midpoint of a duration of the second DC voltage level, and adjusting the timing of the second plurality of electronic switches based on the phase shift angle value.

INDUSTRIAL APPLICABILITY

The techniques to balance capacitor voltages in a multilevel dual active bridge converter described in this disclosure have significant industrial applicability, such as in power electronics and renewable energy systems. Unbalanced capacitors in a dual active bridge converter can lead to several issues, including reduced efficiency, premature failure, increased output voltage ripple, and potential transformer failures. The techniques for balancing capacitor voltages addresses these challenges and adds industrial value.

For example, by balancing the capacitor voltages, the technique ensures a more even distribution of voltage across the capacitors in the dual active bridge converter. This, in turn, leads to a more balanced operation of the converter, minimizing voltage-related losses and enhancing overall system efficiency.

As another example, balancing the capacitor voltages helps to prevent uneven stress on individual capacitors. By reducing the voltage stress on capacitors, the technique contributes to their prolonged lifespan and improved reliability, reducing the risk of premature failure and costly downtime.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A method for balancing capacitor voltage in a multi-level dual active bridge converter, wherein the dual active bridge converter includes a first full bridge circuit having a first plurality of electronic switches, the first full bridge circuit configured to generate a first group of three voltage levels including a first DC voltage level, a one-half first DC voltage level, and a first zero voltage level, a second full bridge circuit including a second plurality of electronic switches, the second full bridge circuit configured to generate a second group of three voltage levels including a second DC voltage level, a one-half second DC voltage level, and a second zero voltage level, a transformer coupled between the first full bridge circuit and the second full bridge circuit, and an inductor coupled between the first full bridge circuit and a primary winding of the transformer, the method comprising:
   determining a first capacitor voltage difference between a first capacitor voltage and a second capacitor voltage of the first full bridge circuit;
   determining a first zero voltage level correction value based on the first capacitor voltage difference;
   adjusting an internal phase shift value corresponding to a duration of the first zero voltage level based on the first zero voltage level correction value; and
   adjusting, based on the adjusted internal phase shift value corresponding to the duration of the first zero voltage level, a timing of the first plurality of electronic switches to reduce the first capacitor voltage difference between the first capacitor voltage and the second capacitor voltage of the first full bridge circuit, including:
      increasing a magnitude of a first current flowing into a first capacitor and a second capacitor, respectively, to reduce the first capacitor voltage difference between the first capacitor voltage and the second capacitor voltage of the first full bridge circuit.

2. The method of claim 1, further comprising:
determining a first power transfer value,
wherein determining the first zero voltage level correction value based on the first capacitor voltage difference includes:
determining the first zero voltage level correction value based on 1) the first capacitor voltage difference, 2) the first power transfer value, 3) the first DC voltage level, and 4) the second DC voltage level.

3. The method of claim 1, further comprising:
receiving an internal phase shift value corresponding to a duration of the one-half first DC voltage level; and
adjusting, based on the internal phase shift value corresponding to the duration of the one-half first DC voltage level, the timing of the first plurality of electronic switches.

4. The method of claim 1, further comprising:
determining a second capacitor voltage difference between a third capacitor voltage and a fourth capacitor voltage of the second full bridge circuit;
determining a second zero voltage level correction value based on the second capacitor voltage difference;
adjusting an internal phase shift value corresponding to a duration of the second zero voltage level based on the second zero voltage level correction value; and
adjusting, based on the adjusted internal phase shift value corresponding to the duration of the second zero voltage level, a timing of the second plurality of electronic switches to reduce the second capacitor voltage difference between the third capacitor voltage and the fourth capacitor voltage of the second full bridge circuit.

5. The method of claim 4, further comprising:
receiving an internal phase shift value corresponding to a duration of the one-half second DC voltage level; and
adjusting, based on the internal phase shift value corresponding to the duration of the one-half second DC voltage level, the timing of the second plurality of electronic switches.

6. The method of claim 5, further comprising:
receiving a phase shift angle value corresponding to a time difference between a midpoint of a duration of the first DC voltage level and a midpoint of a duration of the second DC voltage level; and adjusting the timing of the second plurality of electronic switches based on the phase shift angle value.

7. A multilevel dual active bridge converter configured for balancing capacitor voltage, the multilevel dual active bridge converter comprising:
a first full bridge circuit having a first plurality of electronic switches, the first full bridge circuit configured to generate a first group of three voltage levels including a first DC voltage level, a one-half first DC voltage level, and a first zero voltage level;
a second full bridge circuit including a second plurality of electronic switches, the second full bridge circuit configured to generate a second group of three voltage levels including a second DC voltage level, a one-half second DC voltage level, and a second zero voltage level;
a transformer coupled between the first full bridge circuit and the second full bridge circuit;
an inductor coupled between the first full bridge circuit and a primary winding of the transformer; and
a control circuit configured for:
determining a first capacitor voltage difference between a first capacitor voltage and a second capacitor voltage of the first full bridge circuit;
determining a first zero voltage level correction value based on the first capacitor voltage difference;
adjusting an internal phase shift value corresponding to a duration of the first zero voltage level based on the first zero voltage level correction value; and
adjusting, based on the adjusted internal phase shift value corresponding to the duration of the first zero voltage level, a timing of the first plurality of electronic switches to reduce the first capacitor voltage difference between the first capacitor voltage and the second capacitor voltage of the first full bridge circuit, including:
increasing a magnitude of a first current flowing into a first capacitor and a second capacitor, respectively, to reduce the first capacitor voltage difference between the first capacitor voltage and the second capacitor voltage of the first full bridge circuit.

8. The multilevel dual active bridge converter of claim 7, wherein the control circuit is further configured for:
determining a first power transfer value,
wherein determining the first zero voltage level correction value based on the first capacitor voltage difference includes:
determining the first zero voltage level correction value based on 1) the first capacitor voltage difference, 2) the first power transfer value, 3) the first DC voltage level, and 4) the second DC voltage level.

9. The multilevel dual active bridge converter of claim 7, wherein the control circuit is further configured for:
receiving an internal phase shift value corresponding to a duration of the one-half first DC voltage level; and
adjusting, based on the internal phase shift value corresponding to the duration of the one-half first DC voltage level, the timing of the first plurality of electronic switches.

10. The multilevel dual active bridge converter of claim 7, wherein the control circuit is further configured for:
determining a second capacitor voltage difference between a third capacitor voltage and a fourth capacitor voltage of the second full bridge circuit;
determining a second zero voltage level correction value based on the second capacitor voltage difference;

adjusting an internal phase shift value corresponding to a duration of the second zero voltage level based on the second zero voltage level correction value; and
adjusting, based on the adjusted internal phase shift value corresponding to the duration of the second zero voltage level, a timing of the second plurality of electronic switches to reduce the second capacitor voltage difference between the third capacitor voltage and the fourth capacitor voltage of the second full bridge circuit.

11. The multilevel dual active bridge converter of claim 10, wherein the control circuit is further configured for:
receiving an internal phase shift value corresponding to a duration of the one-half second DC voltage level; and
adjusting, based on the internal phase shift value corresponding to the duration of the one-half second DC voltage level, the timing of the second plurality of electronic switches.

12. The multilevel dual active bridge converter of claim 11, wherein the control circuit is further configured for:
receiving a phase shift angle value corresponding to a time difference between a midpoint of a duration of the first DC voltage level and a midpoint of a duration of the second DC voltage level; and
adjusting the timing of the second plurality of electronic switches based on the phase shift angle value.

13. A control circuit configured for balancing capacitor voltage in a multilevel dual active bridge converter, wherein the dual active bridge converter includes a first full bridge circuit having a first plurality of electronic switches, the first full bridge circuit configured to generate a first group of three voltage levels including a first DC voltage level, a one-half first DC voltage level, and a first zero voltage level, a second full bridge circuit including a second plurality of electronic switches, the second full bridge circuit configured to generate a second group of three voltage levels including a second DC voltage level, a one-half second DC voltage level, and a second zero voltage level, a transformer coupled between the first full bridge circuit and the second full bridge circuit, and an inductor coupled between the first full bridge circuit and a primary winding of the transformer, the control circuit configured to perform operations comprising:
determining a first capacitor voltage difference between a first capacitor voltage and a second capacitor voltage of the first full bridge circuit;
determining a first zero voltage level correction value based on the first capacitor voltage difference;
adjusting an internal phase shift value corresponding to a duration of the first zero voltage level based on the first zero voltage level correction value; and
adjusting, based on the adjusted internal phase shift value corresponding to the duration of the first zero voltage level, a timing of the first plurality of electronic switches to reduce the first capacitor voltage difference between the first capacitor voltage and the second capacitor voltage of the first full bridge circuit, including:
increasing a magnitude of a first current flowing into a first capacitor and a second capacitor, respectively, to reduce the first capacitor voltage difference between the first capacitor voltage and the second capacitor voltage of the first full bridge circuit.

14. The control circuit of claim 13, further configured to perform operations comprising:
determining a first power transfer value,
wherein determining the first zero voltage level correction value based on the first capacitor voltage difference includes:

determining the first zero voltage level correction value based on 1) the first capacitor voltage difference, 2) the first power transfer value, 3) the first DC voltage level, and 4) the second DC voltage level.

15. The control circuit of claim 13, further configured to perform operations comprising:
   receiving an internal phase shift value corresponding to a duration of the one-half first DC voltage level; and
   adjusting, based on the internal phase shift value corresponding to the duration of the one-half first DC voltage level, the timing of the first plurality of electronic switches.

16. The control circuit of claim 13, further configured to perform operations comprising:
   determining a second capacitor voltage difference between a third capacitor voltage and a fourth capacitor voltage of the second full bridge circuit;
   determining a second zero voltage level correction value based on the second capacitor voltage difference;
   adjusting an internal phase shift value corresponding to a duration of the second zero voltage level based on the second zero voltage level correction value; and
   adjusting, based on the adjusted internal phase shift value corresponding to the duration of the second zero voltage level, a timing of the second plurality of electronic switches to reduce the second capacitor voltage difference between the third capacitor voltage and the fourth capacitor voltage of the second full bridge circuit.

17. The control circuit of claim 16, further configured to perform operations comprising:
   receiving an internal phase shift value corresponding to a duration of the one-half second DC voltage level; and
   adjusting, based on the internal phase shift value corresponding to the duration of the one-half second DC voltage level, the timing of the second plurality of electronic switches.

18. The control circuit of claim 17, further configured to perform operations comprising:
   receiving a phase shift angle value corresponding to a time difference between a midpoint of a duration of the first DC voltage level and a midpoint of a duration of the second DC voltage level; and
   adjusting the timing of the second plurality of electronic switches based on the phase shift angle value.

* * * * *